United States Patent [19]

Upp

[11] Patent Number: 5,033,064
[45] Date of Patent: Jul. 16, 1991

[54] CLOCK DEJITTER CIRCUIT FOR REGENERATING DS1 SIGNAL

[75] Inventor: Daniel C. Upp, Southbury, Conn.

[73] Assignee: Transwitch Corporation, Shelton, Conn.

[21] Appl. No.: 439,097

[22] Filed: Nov. 17, 1989

Related U.S. Application Data

[63] Continuation-in-part of Ser. No. 283,171, Dec. 9, 1988.

[51] Int. Cl.$^5$ .......................... H04L 7/00; H04J 3/06
[52] U.S. Cl. ..................................... 375/118; 370/102
[58] Field of Search ................ 375/112, 118; 370/102, 370/105.3

[56] References Cited

U.S. PATENT DOCUMENTS

| | | | |
|---|---|---|---|
| 4,053,715 | 10/1977 | Drapkin | 370/102 |
| 4,159,535 | 6/1979 | Fuhrman | 375/118 |
| 4,551,830 | 11/1985 | Huffman | 370/102 |
| 4,613,969 | 9/1986 | Draayer | 340/825.8 |
| 4,644,535 | 2/1987 | Johnson et al. | 370/99 |
| 4,658,152 | 4/1987 | Walters | 370/99 |
| 4,667,320 | 5/1987 | Onno et al. | 340/825.79 |
| 4,667,324 | 5/1987 | Graves | 375/112 |
| 4,674,088 | 6/1987 | Grover | 370/102 |
| 4,685,101 | 8/1987 | Segal et al. | 370/102 |
| 4,697,262 | 9/1987 | Segal et al. | 370/84 |
| 4,719,624 | 1/1988 | Bellisio | 370/112 |
| 4,731,878 | 3/1988 | Vaidya | 370/1 |
| 4,760,573 | 7/1988 | Calvignac et al. | 370/99 |
| 4,763,123 | 8/1988 | Yasuda | 340/825.03 |
| 4,807,280 | 2/1989 | Posner et al. | 379/272 |
| 4,833,673 | 5/1989 | Chao et al. | 370/102 |
| 4,834,483 | 5/1989 | Arthurs et al. | 370/1 |
| 4,852,128 | 7/1989 | Lill | 370/99 |
| 4,855,999 | 8/1989 | Chao | 370/112 |
| 4,899,333 | 2/1990 | Roediger | 370/60 |
| 4,914,429 | 4/1990 | Upp | 340/825.8 |
| 4,928,275 | 5/1990 | Moore et al. | 370/102 |
| 4,935,921 | 6/1990 | Ishizaki et al. | 370/102 |

Primary Examiner—Douglas W. Olms
Assistant Examiner—Marianne Huseman
Attorney, Agent, or Firm—David P. Gordon

[57] ABSTRACT

A DS1 dejitter circuit has a control circuit for generating six pulses over a one hundred and ninety three 1.544 Mb/sec clock cycle, and a clock circuit for tracking the frequency of a jittered incoming DS1 signal, and based on that frequency, and utilizing the six pulses, generating a clean DS1 signal at the nominal rate of the jittered incoming signal. The control circuit preferably includes a divide by 28 or 29 circuit which receives a 44.736 Mb/sec (DS3) input clock signal, a mod 193 counter, and a count decoder for providing the six control pulses over the 193 count. Logic circuitry is provided for taking the outputs from the count decode and controlling the divide block to guarantee that the divide block divides the DS3 signal by 29 one hundred eighty-eight times for every five times the divide block divides the DS3 signal by 28. In this manner an average clock of 1.544 Mb/sec (the standard DS1) rate is obtained from the divide block. The clock circuit includes a FIFO, a clock rate control circuit and another divide by 28 or 29 block. The FIFO receives the incoming jittered DS1 signal. The clock rate control circuit senses how full the FIFO is, and using that information along with the pulses from the control circuit regulates the divide block to divide the DS3 signal by 28 either four, five, or six times in a one hundred ninety-three clock cycle. Where it is desired to dejitter a plurality of DS1 signals, a single common control circuit can be used to supply the six control pulses to a plurality of clock rate control circuits.

24 Claims, 4 Drawing Sheets

FIG. IA
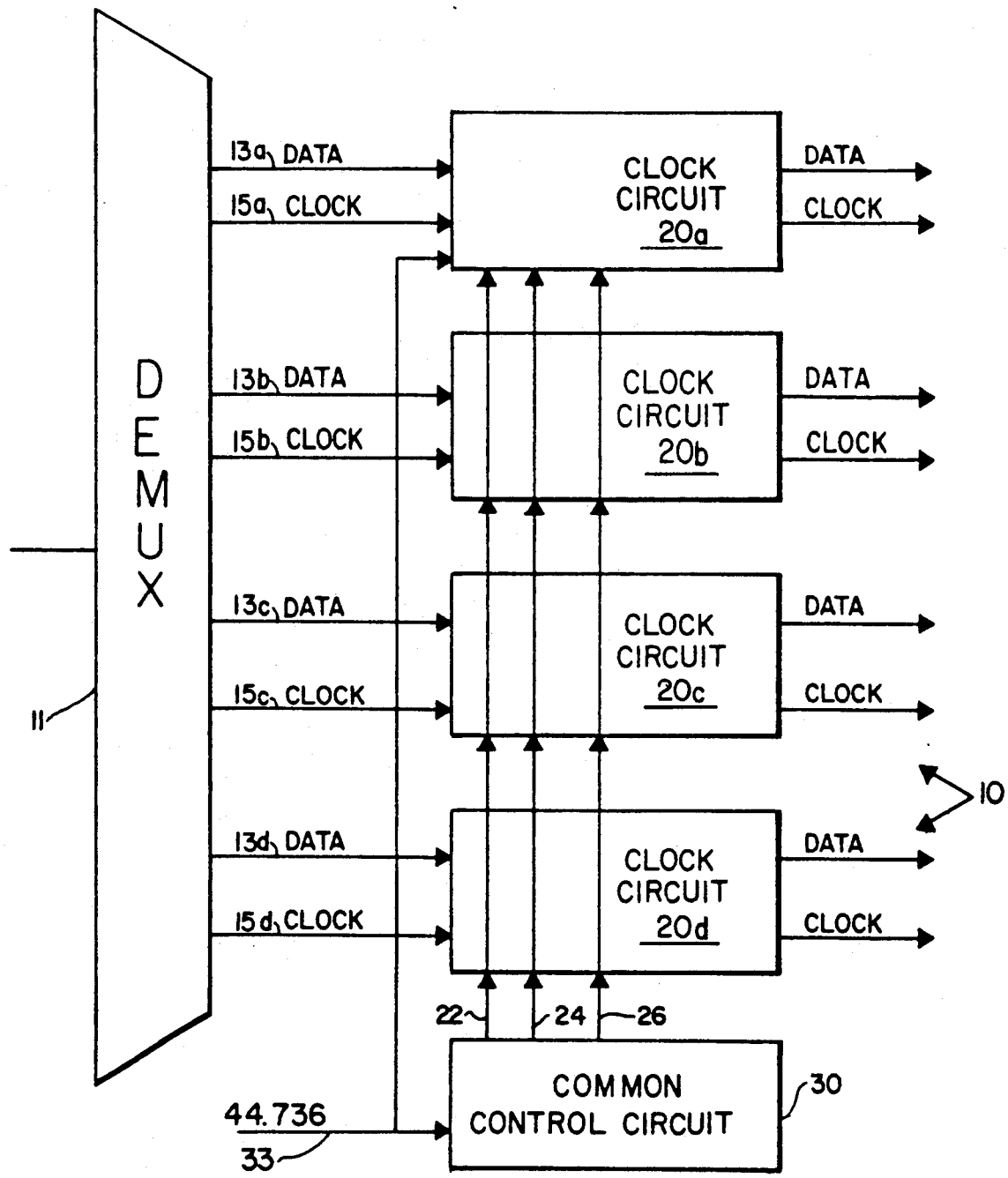

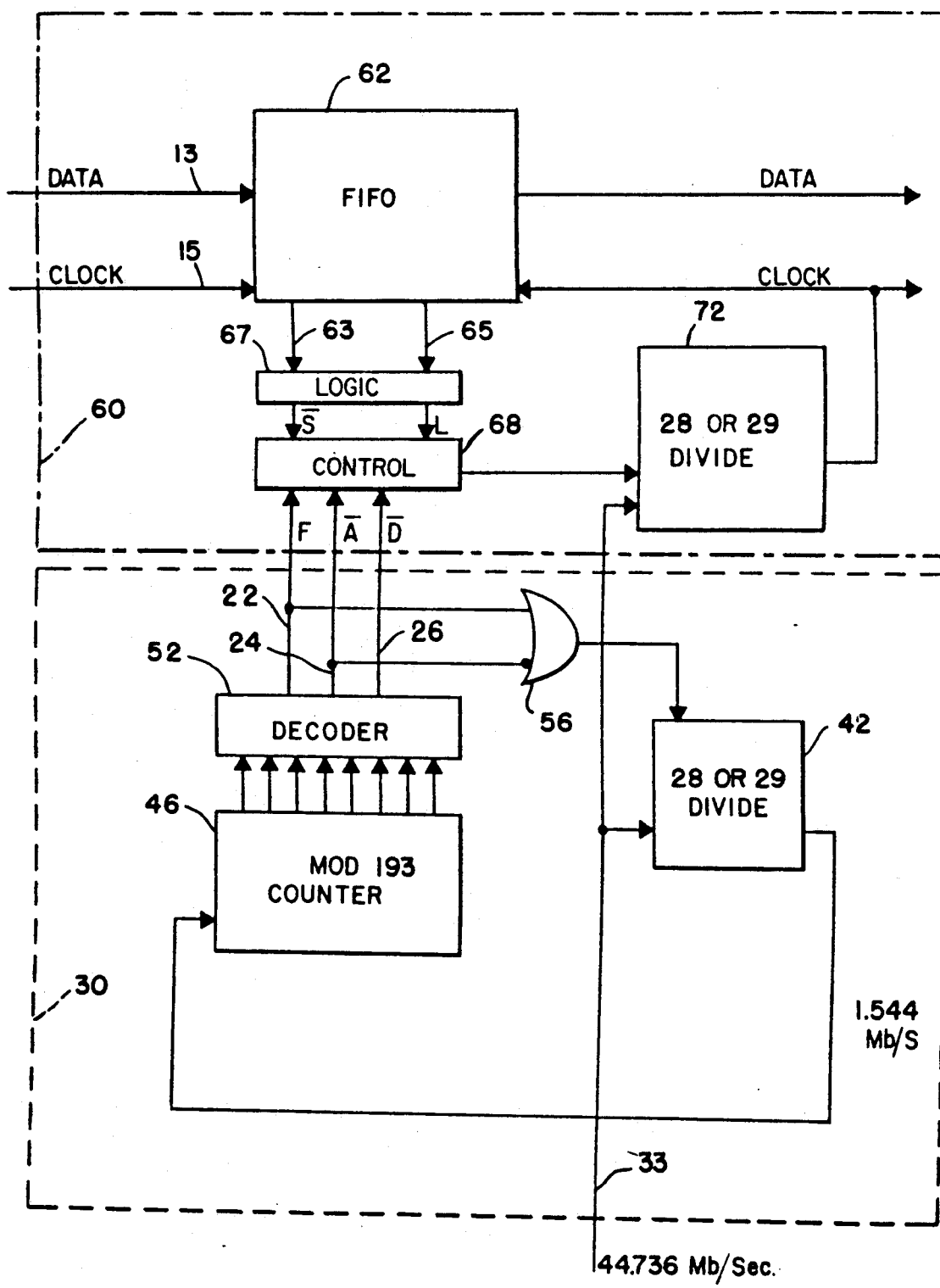
FIG. IB.

CLOCK DEJITTER CIRCUIT FOR REGENERATING DS1 SIGNAL

This is a continuation-in-part of U.S. Ser. No. 07/283,171 filed Dec. 9, 1988, which is assigned to the assignee hereof.

BACKGROUND OF THE INVENTION

This invention relates generally to a digital circuit for regenerating a jittered clock signal. More particularly, this invention relates to a dejitter circuit which receives a jittered DS1 signal, and which uses a DS3 clock source for regenerating the DS1 signal at the rate of the incoming DS1 signal.

DS0, DS1, DS2, and DS3 telecommunications signals are well defined according to CCITT specifications. Essentially, a DS0 signal is a signal having a bandwidth of 64 Kbits/sec. A DS1 signal is comprised of twenty-four DS0 segments plus overhead for a total bandwidth of 1.544 Mbits/sec (plus or minus approximately 200 b/sec). In turn, four DS1 signals plus some overhead (bit stuffing) constitute a 6.312 Mb/sec DS2 signal, and four DS2 signals plus some additional overhead constitutes a 44.736 Mb/sec DS3 signal.

DS3 signals are commonly used between central offices for high speed communication. When the DS3 signal is received, it is often demultiplexed into its seven composite DS2 signals, with the bit stuffing utilized for control and essentially removed from the DS2 signals. In turn, the DS2 signals are often demultiplexed into their four composite DS1 signals with the DS2 bit stuffing utilized for control and essentially removed from the resulting DS1 signals. Each resulting DS1 signal has a bandwidth of approximately 1.544 Mb/sec plus or minus 200 b/sec. However, because in generating the DS1 signal the overhead or stuffing bits are removed, the bit stream of the DS1 signal is gapped or "jittered". Additional jitter termed "transport" or "systematic" jitter is also found in the DS1 signal due to the fact that all systems introduce noise into the signals which they are carrying. Jitter is undesirable as it can introduce error in the decoding of the signal.

Standard devices such as phase locked loops are known in the art for tracking signal rates and for generating a clock of the nominal received rate for eliminating jitter. Phase locked loops however, have several drawbacks including expense and the requirement of analog implementation. The subject invention eliminates the need for a phase locked loop through the use of a small amount of digital circuitry capable of implementation on a small section of an LSI circuit.

SUMMARY OF THE INVENTION

It is therefore an object of the invention to provide a digital circuit for regenerating a clock signal for a jittered DS1 signal at the nominal rate of the jittered DS1 signal.

It is a further object of the invention to provide a dejitter circuit capable of servicing a plurality of DS1 signals, the dejitter circuit including a common control circuit and a plurality of individual clock circuits.

In accord with the objects of the invention, a DS1 dejitter circuit broadly comprises control circuit means for generating six pulses over a one hundred and ninety three clock cycle, and a clock circuit for tracking the speed of a jittered incoming DS1 signal and based on that speed, and utilizing the six pulses, generating a clean DS1 signal at the nominal rate of the jittered incoming signal.

The control circuit preferably includes a divide by twenty-eight—divide by twenty-nine circuit which receives a 44.736 Mb/sec (DS3) input clock signal, a modulus one hundred ninety-three counter, and a count decode for providing six control pulses over the one hundred ninety-three count, and a logic gate for taking the output from the count decode and controlling the divide block to guarantee that the divide block divides the DS3 signal by twenty-nine one hundred eighty-eight times for every five times the divide block divides the DS3 signal by twenty-eight. In this manner an average clock of 1.544 Mb/sec (the standard DS1) rate is obtained from the divide block.

The six control pulses are preferably provided on three lines, with four pulses occurring during the one hundred ninety-three count cycle on one line, and one pulse occurring during the cycle on each of the other two lines.

The clock circuit includes a FIFO, a clock rate controller, and a divide by twenty-eight—divide by twenty-nine block. The FIFO receives the incoming jittered DS1 signal, and provides the outgoing DS1 signal according to a rate set by the clock rate control and divide block. The clock rate controller senses how full the FIFO is, and using that information along with the pulses from the common control means regulates the divide block. If data is being pulled from the FIFO at too great a rate, the FIFO becomes too empty, and the control means must slow down the output. Conversely, if the data is being pulled too slowly from the FIFO, the FIFO fills up, and the control means must increase the data output rate. The controller increases or decreases the data output by causing the divide block to divide the DS3 signal by twenty-eight either four, five, or six times in a one hundred ninety-three clock cycle.

Where it is desired to dejitter a plurality of DS1 signals, a single common means can be used to supply the six control pulses to a plurality of clock circuits.

Additional objects and advantages of the invention will become apparent to those skilled in the art upon reference to the detailed description taken in conjunction with the provided drawings.

BRIEF DESCRIPTION OF THE DRAWINGS

FIG. 1a is a block diagram of the dejitter circuit of the invention;

FIG. 1b is a block diagram showing a single common control circuit used in conjunction with a plurality of clock circuits for providing a plurality of dejittered DS1 signals;

DETAILED DESCRIPTION OF THE PREFERRED EMBODIMENT

Figure 2A:
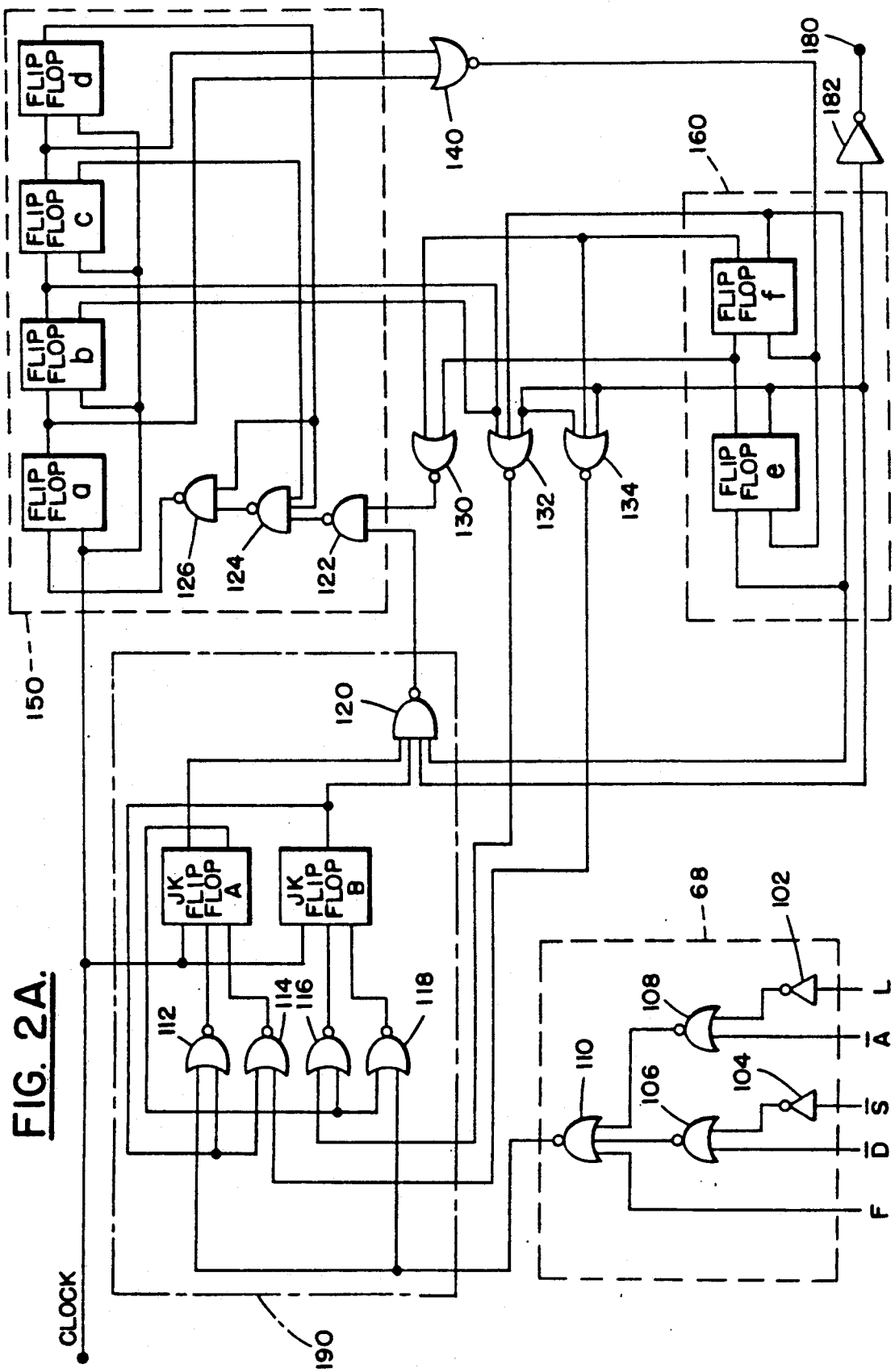
FIG. 2a is a block diagram of the divide block of the dejitter circuit.

Turning to FIG. 1a, a dejitter circuit 10 for regenerating DS1 signals is seen. The jittered DS1 signals are often outputs from a DS2/DS1 demultiplexer 11 and include data lines 13a–13d and clock signals 15a–15d. The data and clock signal are input into clock circuits 20a–20d of the dejitter circuit. Other inputs into the clock circuits 20a–20d are three lines of control output 22, 24, and 26 from the common control circuit 30, and a 44.736 Mb/sec DS3 clock 33.

More detail of the common control circuit 30 and a single clock circuit 20 is seen in block diagram form in FIG. 1b. The common control circuit 30 has the 44.736 Mb/sec clock 33 as an input into a divide block 42, details of which are discussed hereinbelow with reference to FIG. 2a. The purpose of divide block 42 is to take the 44.736 Mb/sec clock signal and divide it down so as to create a clock signal with an average frequency of 1.544 Mb/sec (i.e. the DS1 frequency). The 1.544 Mb/sec average frequency is obtained by dividing the 44.736 Mb/sec clock by twenty-nine a desired number of times and by dividing the 44.736 Mb/sec clock by twenty-eight a different number of times during a cycle. In particular, in a cycle of one hundred and ninety-three, the 44.736 Mb/sec clock should be divided by twenty-nine exactly one hundred eighty-eight times, and by twenty-eight exactly five times in order to obtain the 1.544 Mb/sec average frequency. Preferably, the five divide by twenty-eight's should be distributed over the one hundred eighty-eight divide by twenty-nine's in order to minimize clock skew.

The output of the divide block 42 is provided to a mod one hundred ninety-three counter 46 which is preferably implemented as an eight bit linear feedback shift register of standard design with a reset after the one hundred ninety-third count. Coupled to the counter 46 is a decoder 52 which is arranged to provide an output pulse (active high) signal on six counts over the one hundred ninety-three count cycle. Preferably, four of the output pulses are provided on output control line 22, while a single output pulse (active low) is provided on output control lines 24 and 26. Output control line 22 pulses on counts zero, forty-eight, ninety-six and one hundred forty-four, while control line 24 pulses on count twenty-four, and control line 26 pulses on count one hundred twenty. Decoder 52 is thus set in a conventional manner to accommodate those requirements. It will be appreciated, of course, that other counts could be utilized to control when control lines 22, 24, and 26 pulse, provided that control line 22 pulses four times, and control lines 24 and 26 once each over the one hundred and ninety-three cycle.

As indicated in FIG. 1b, control lines 22 and 24 are coupled via NOR gate 56 (with an inverted input for line 24) to the divide block 42. Whenever the output on either control line 22 or control line 24 pulses, the signal is passed to divide block 42, and divide block 42 divides by twenty-eight instead of twenty-nine. Since control line 22 goes high exactly four times and control line 24 goes high exactly once over the cycle of one hundred ninety-three, divide block 42 divides by twenty-eight five times and by twenty-nine one hundred eighty-eight times as desired.

The control lines 22, 24, and 26 are fed to the clock circuit means 60, which basically includes a FIFO 62, a logic block 67, a control circuit 68, and another divide block 72. Divide block 72 also has the DS3 clock of 44.736 Mb/sec as an input. The output of divide block 72 serves as the output clock for FIFO 62 and also serves to clock out the data from FIFO 62.

FIFO 62 is preferably a twelve bit FIFO with leads 63 and 65 from the fifth and seventh registers respectively. The leads 63 and 65 indicate whether data is found in the fifth and seventh registers of the FIFO 62. If data from data line 13 is being clocked into the FIFO 62 at a frequency of 1.544 Mb/sec, FIFO 62 will typically have data in six registers only, and the lead 63 from the fifth register will indicate the presence of data, while the lead 65 from the seventh register will indicate the lack of data. If data from data line 13 is being clocked into the FIFO 62 at a frequency greater than 1.544 Mb/sec, data will build in the FIFO if the data output from FIFO 62 is at 1.544 Mb/sec. As data builds in the FIFO, both leads 63 and 65 will indicate the presence of data, and a data "long" condition will be established by logic block 67 and sent as a positive pulse to the "L" input of control circuit 68. Conversely, if data from data line 13 is being clocked into the FIFO at a frequency less than 1.544 Mb/sec, and the output from FIFO 62 is at 1.544 Mb/sec, the data held by the FIFO 62 will decrease. As a result, both leads 63 and 65 will indicate the lack of data, and a data "short" condition will be established by logic block 67 and sent as a active low pulse to the S input to control circuit 68.

If a data "long" or data "short" condition is established, it means that the output rate from the FIFO is not matching the input rate. The output clock being generated by the divide block 72 must be adjusted accordingly. The control circuit 68 uses the status information from the FIFO to cause the pulses coming from the common circuit to appropriately control the divide block 72. In particular, at a minimum, the divide by twenty-eight should be actuated four times per cycle of one hundred ninety-three, and at a maximum, the divide by twenty-eight should be actuated six times per cycle of one hundred ninety-three. In fact, if the divide by twenty-eight is actuated only four times per cycle, the output frequency of the divide block clock will be approximately 1.5437 Mb/sec, while if the divide by twenty-eight is actuated six times, the output frequency will be approximately 1.5443 Mb/sec. Of course, these frequencies are slightly outside of the permissible range for a DS1 signal. Thus, to obtain a permissible DS1 output clock, actuation of the divide by twenty-eight either four or six times in a cycle of one hundred ninety-three should only occur at most two out of every three one hundred ninety-three cycles.

The output of divide block 72 acts as the read clock of the FIFO 62. Since logic block 67 derives signals L and S from an observation of the data length in FIFO 62, and since these observations are used to control the number of divide by twenty-eight and divide by twenty-nine cycles perfomed by the divide block 72, the entire loop is self-adjusting. Hence, the loop uses the correct number of frames at 1.544 Mb/sec and at 1.5437 or 1.5443 Mb/sec to guarantee that the output average frequency from FIFO exactly matches the average frequency of data being received by the FIFO from the DS1 source. The data clocked out of FIFO in this manner is relatively jitter free.

Turning to FIG. 2a, details of the control circuit 68 and the divide block 72 are seen in detail (divide block 42 being essentially the equivalent of divide block 72). The inputs into control circuit 68 are the control lines 22, 24, and 26 from common control circuit 30, and the short and long lines 63 and 65 from the FIFO, which are indicated as F, D (delete), A (add), S (short) and L (long) respectively. The F input is fed directly to NOR gate 110, and causes the output of NOR gate to go low at least four times in the one hundred ninety-three count cycle. As will be discussed hereinafter, NOR gate 110 going low causes the divide block 72 to divide by twenty-eight instead of twenty-nine.

Another condition which causes NOR gate 110 to go low is when the delete decode line is pulsed when the buffer is not short. When the delete decode signal D is pulsed (active low), but the FIFO is not short (S is high), the short line is inverted by inverter 104, and the inputs into NOR gate 106 consist of the low output from inverter 104 and the active low input from the delete decode control. With two low inputs, NOR gate 106 goes high and forces the output of NOR gate 110 low. Thus, when the buffer is not short, a fifth divide by twenty-eight is accomplished upon the control line 24 being pulsed.

The last situation which can cause NOR gate 110 to go low is when the buffer is long and the add decode line is pulsed. The buffer long line L is inverted by inverter 102, and together with the add decode signal is input to NOR gate 108. Thus, if the FIFO is long (L high), and the add decode is pulsed (A active low pulse), the output of NOR gate 108 goes high. As a result, the output of three gate NOR 110 goes low, and a sixth divide by twenty-eight is accomplished in the cycle of one hundred ninety-three.

When the FIFO is short, only four divide by twenty-eight's are accomplished instead of the six which occur when the buffer is long. If the FIFO is short (S is low) when the delete decode signal is pulsed, the short line is inverted by inverter 104, and the inputs into NOR gate 106 consist of the high output from inverter 104 and the active low of the delete decode line. The high output from inverter 104 causes the output of NOR gate 106 to go low, thereby causing the output of NOR gate 110 to go high. As a result, when the FIFO is short, the delete decode signal coming from the common circuit does not cause a divide by twenty-eight (i.e. a divide by twenty-eight is deleted from the cycle). Similarly, when the FIFO not long when the add decode line is pulsed, NOR gate 108 has a high value received from inverter 102 which keeps the NOR gate 108 output low. With NOR gate 108 low, NOR gate 110 is kept high, and the divide by twenty-eight is avoided (i.e. a divide by twenty-eight is not added to the cycle).

The output of NOR gate 110 is fed to a state machine 190 which is comprised of NOR gate 112, NAND gate 114, NOR gate 116, NAND gate 118, JK flip-flops A and B, and 4-input NAND gate 120. The state machine functions as a deglitcher for the inputs as well as a synchronizer for synchronizing the signal output from NOR gate 110 as represented by NAND gate 120 with the signal output from NOR gate 130. Effectively, the state machine permits the state of NOR gate 110 (which is controlled by the controller) to enter NAND gates 122, 124 and 126 via NAND gate 120 so that control of a twenty-eight or a twenty-nine divide is effectuated.

Figure 2B:
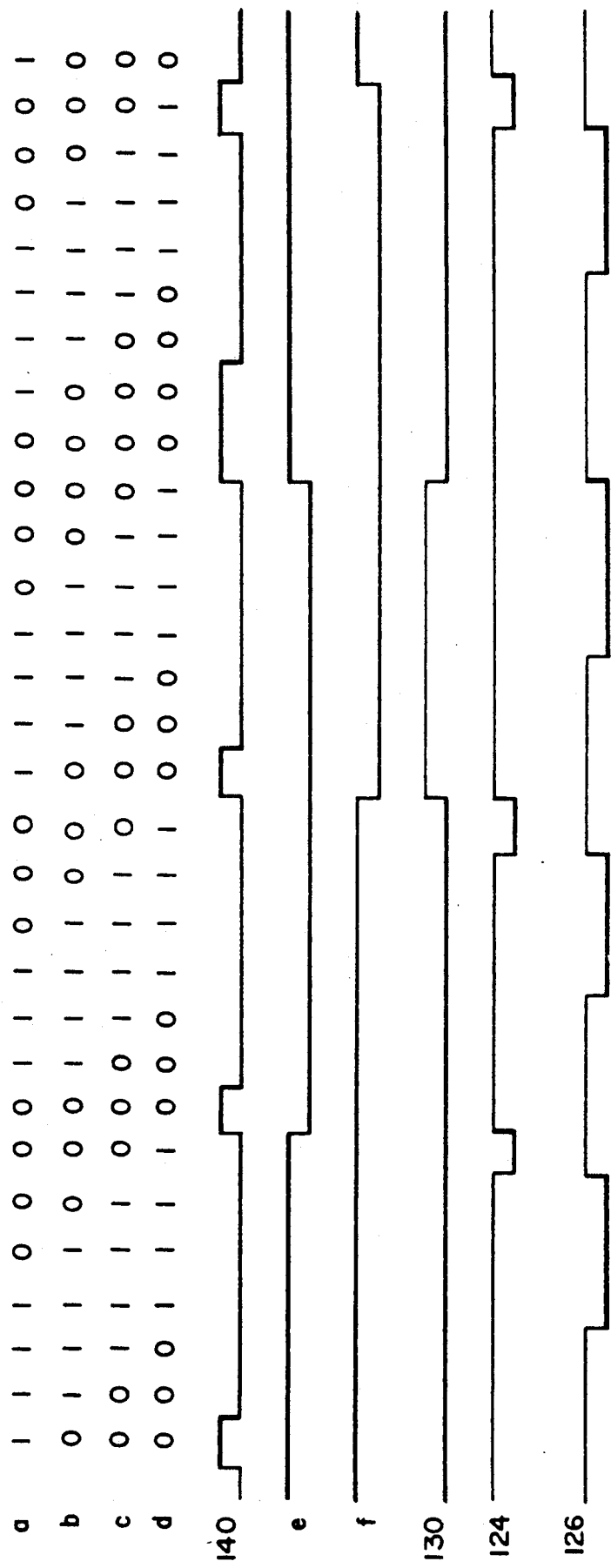
FIG. 2b is a wave form and bit value diagram for a typical twenty-nine divide cycle.

The divide by twenty-eight or divide by twenty-nine is implemented as two sets of shift-register counters. A first counter 150 is comprised of DQ flip-flops a, b, c, and d which have the DS3 clock as their clock inputs. The DQ flip-flops cycle through either a seven or an eight number cycle as will be described below. The eight number cycle is:

| 0000 | 1000 | 1100 | 1110 | 1111 | 0111 | 0011 | 0001 | while the seven number cycle is the same except it omits state 0000 and starts at 1000 instead (the outputs of flip-flops a, b, c, and d being seen in FIG. 2b in a twenty-nine count cycle). The Q output of flip-flop d is fed back via NAND gate 126 to the D input of flip-flop a. Thus, when the output of d is a "0", the input to a is a "1". When the output of d is a "1", the input to a is dependent on the output of NAND gate 124. The not Q output of flip-flop c and the Q output of flip-flop d together help control the output of NAND gate 124. Generally, the output of NAND gate 124 is "1", unless the not Q output of flip-flop c is "1" and the Q output of flip-flop d is "1". This state only occurs when the number cycle is at the last number "0001". In such a situation, the output of NAND gate 124 is the inverse of NAND gate 122, and the output of NAND gate 122 controls the input into flip-flop a. Thus, if at the end of the number cycle NAND gate 122 is a value "1", a "1" will appear at the D input into flip-flop and the number cycle will start at "1000", while if at the end of the number cycle a "0" appears at the output of NAND gate 122, a "0" will appear at the D input into flip-flop a and the number cycle will start at "0000". Effectively, NAND gate 122 controls whether counter 150 will be a seven cycle counter or an eight cycle counter.

Control of NAND gate 122 is based on two factors: the output from NAND gate 120 of the state machine (which is based on the control logic of the controller), and the state of the four counter 160 which is also implemented as a shift register. Counter 160 includes flip-flops e and f. The clock inputs into flip-flops e and f are derived from the Q outputs of flip-flops a and c which are fed to NOR gate 140. Thus, a positive clock pulse only occurs when the Q outputs of flip-flops a and c are both "0". Because flip-flops a and c change to both "0" only once during the seven or eight count cycle of counter 150 (as the first count of the eight count cycle has both "0" which is not a change) the state of flip-flops e and f are only changed once every seven or eight count cycle (as seen by the 140 wave form of FIG. 2b).

Because of the way flip-flops e and f are arranged with the Q output of e acting as the D input into f, and the not Q output of f acting as the D input into e, the four counter 160 cycles through the following count 00 10 11 01. As the circuit output 180 is taken from the not Q output of flip-flop e (via inverter 182), the output only changes once in the cycle of the four counter 160 (as seen by the e and f waveforms of FIG. 2b). Thus, depending on how often the clock input from NOR gate 140 is pulsed, a divide by twenty-eight or divide by twenty-nine is accomplished.

The Q output from flip-flop f and the not Q output from flip-flop e are fed to NOR gate 130 which acts as an input into NAND gate 122 Thus, the input into NOR gate 130 follows the cycle: 10 00 01 11, and the output from NOR gate 130 goes high only once during the cycle (as seen by the 130 wave form of FIG. 2b). When the output from NOR gate 130 goes high, an opportunity exists to create an eight count for counter 150 (e.g. a twenty-nine count for the counter). If output from NAND gate 120 is high when the output from NOR gate 130 goes high, the output from NAND gate 122 goes low forcing the output from NAND 124 high which in turn forces the output from NAND 126 low. With a low input into flip-flop a, the counter 150 starts at 0000 rather than at 1000, and an eight count is effectuated. In the normal sequence, the output from NAND 120 stays high such that every fourth count through the four counter 160, both inputs to NAND 122 are high and cause a zero input into flip-flop a. However, where it is desired to effectuate a twenty-eight count instead of a twenty-nine count, the output of NOR gate 110 is forced low. As a result, the output of NAND gate 120 is forced low when the output of NOR gate goes high, and instead of two high inputs into NAND gate 122, a high and a low input are provided and keep the output of NAND gate 122 high. With the output of NAND gate 122 high, at the end of the cycle of counter 150, the D input into flip-flop a is high, and counter 150 starts a seven cycle count instead of the eight cycle count. As a result, a twenty-eight divide is effectuated rather than a twenty-nine divide.

For sake of completeness, it should be noted that the not Q output of flip-flop e and the Q output of flip-flop f are fed to 3-input NOR gate 134 which in turn is an input into NAND gate 114 of the state machine 190. Similarly, the not Q output of flip-flop e and the not Q output of flip-flop f are fed to 3-input NAND gate 132, which in turn is an input into NOR gate 116 of the state machine. The not Q outputs from flip-flops e and f are also fed as inputs to four input NAND gate 120. The other inputs into NAND gate 120 come from flip-flops A and B of the state machine 190. Other inputs into the state machine 190 include the output of NOR gate 110 which is input into NOR gate 112 and NAND gate 118, as well as the output from flip-flop B which is fed back to the inputs of NOR gate 112 and NAND gate 114, as well as being fed forward to four-input NAND gate 120.

There has been described and illustrated herein a clock dejitter circuit for regenerating a DS1 signal. While particular embodiments have been illustrated and described, it is not intended the invention be limited thereto, as it is intended that the invention be as broad in scope as the art will allow and that the specification be read likewise. Thus, while particular circuitry was described for effectuating a divide by twenty-eight—divide by twenty-nine counter, those skilled in the art will appreciate that other circuitry could be utilized to accomplish the same. For example, the shift registers used as counters could be replaced with binary counters. Likewise, instead of separating the divide block into a divide by seven or eight counter and a divide by four counter, a single divide by twenty-nine counter could be provided with control circuitry to divide by twenty-eight in the given circumstances. Also, while a twelve bit FIFO buffer was described with taps at the fifth and seventh bit to determine the fullness state of the buffer, it will be appreciated that a different sized buffer could be utilized with taps at different bit locations. Further, while in the preferred embodiment, a mod one hundred ninety-three counter is utilized, it will be appreciated that a mod thirty-two counter with a delay circuit could be utilized to provide six pulses over a one hundred ninety-three count. Thus, it will be apparent to those skilled in the art that other changes and modifications may be made to the invention as described in the specification without departing from the spirit and scope of the invention as so claimed.

I claim:

1. Apparatus for regenerating a jittered data stream having a frequency of 1.544 Mb/sec ± 200 b/sec, comprising:
   a) a control circuit means for generating six pulses during a one hundred and ninety three count cycle of a 1.544 Mb/sec clock; and
   b) a clock circuit means for receiving said jittered data stream, for tracking the nominal frequency of said jittered data stream, and based upon said nominal frequency, and utilizing said six pulses, generating a substantially unjittered DS1 signal at said nominal frequency of said jittered data stream.

2. Apparatus according to claim 1, said apparatus having a DS3 clock as an input thereto, wherein:
   said control circuit means includes a divide block having said DS3 clock as input thereto, said divide block comprising means for dividing said DS3 clock by twenty-eight and dividing said DS3 clock by twenty-nine to create said clock of 1.544 Mb/sec nominal frequency, wherein said means for dividing divides said DS3 clock by twenty-nine one hundred eight-eight times and by twenty-eight five times during said one hundred and ninety three count cycle.

3. Apparatus according to claim 2, wherein:
   said control circuit means includes a modulus one hundred ninety-three counter having said 1.544 Mb/sec nominal frequency clock as an input thereto, and a count decoder coupled to said modulus one hundred ninety-three counter for providing said six control pulses over said one hundred ninety-three count cycle.

4. Apparatus according to claim 3, wherein:
   said control circuit means includes three output lines over which said six control pulses are provided, wherein four of said control pulses are provided on a first of said three output lines, and one control pulse is provided on each of a second and a third of said three output lines.

5. Apparatus according to claim 4, wherein:
   said control circuit means includes a logic gate coupled to said first and second output lines, said logic gate providing five pulses over said one hundred ninety-three count cycle to said divide block, wherein each of said five pulses causes said divide block to divide by twenty-eight.

6. Apparatus according to claim 4, wherein:
   said clock circuit includes a FIFO, a clock rate control means coupled to said FIFO and to said three output lines of said control circuit means, and a second divide block coupled to said clock rate control means and having said DS3 clock as an input thereto, wherein said FIFO receives said jittered data, and wherein said control block monitors the state of said FIFO, and in response to the state of said FIFO and said six control pulses, controls said second divide block to cause said second divide block to divide down said DS3 clock to provide a substantially unjittered output clock which matches the nominal frequency of said jittered data.

7. Apparatus according to claim 6, wherein:
   said second divide block comprises a seven/eight counter and a four counter, said four counter changing states after each cycle of said seven/eight counter, and the output of said four counter providing a single output pulse over a cycle of said four counter, said single output pulse comprising the clock for said substantially unjittered DS1 signal.

8. Apparatus according to claim 7, wherein:
   said four counter provides a first control signal for said seven/eight counter, and said clock rate control means provides a second control signal for said seven/eight counter, wherein said second divide block further comprises at least one logic gate means coupled to said first and second control signals for controlling whether said seven/eight counter counts to seven or to eight.

9. Apparatus according to claim 8, wherein:
said control block decides whether a divide by twenty-eight or a divide by twenty-nine is desired based on said state of said FIFO as monitored by said clock rate control means, and
said first control signal is of a first polarity for three counts of said four count cycle and of a second polarity for one count of said four count cycle, and said second control signal is a first designated polarity when a twenty-eight divide is desired by said control block and a second designated polarity when a twenty-nine divide is desired by said control block.

10. Apparatus according to claim 9, wherein:
when said first control signal is of said second polarity and said first control signal is of said first designated polarity, said logic gate means controls said seven/eight counter to count seven, and when said first control signal is of said second polarity and said first control signal is of said second designated polarity, said logic gate means control said seven/eight counter to count eight.

11. Apparatus according to claim 10, wherein:
said clock circuit further includes a state machine for receiving an output of said control circuit means and for providing an output constituting said second control signal which is properly synchronous to said first control signal.

12. Apparatus according to claim 1, said apparatus having a DS3 clock as an input thereto, wherein:
said clock circuit includes a FIFO, a clock rate control means coupled to said FIFO and to said control circuit means, and a second divide block coupled to said clock rate control means and having said DS3 clock as an input thereto, wherein said FIFO receives said jittered data, and wherein said control block monitors the state of said FIFO, and in response to the state of said FIFO and said six control pulses, controls said second divide block to cause said second divide block to divide down said DS3 clock to provide a substantially unjittered output clock which matches the nominal frequency of said jittered data.

13. Apparatus according to claim 12, wherein:
said second divide block comprises a seven/eight counter and a four counter, said four counter changing states after each cycle of said seven/eight counter, and the output of said four counter providing a single output pulse over a cycle of said four counter, said single output pulse comprising the clock for said substantially unjittered DS1 signal.

14. Apparatus according to claim 13, wherein:
said four counter provides a first control signal for said seven/eight counter, and said clock rate control means provides a second control signal for said seven/eight counter, wherein said second divide block further comprises at least one logic gate means coupled to said first and second control signals for controlling whether said seven/eight counter counts to seven or to eight.

15. Apparatus according to claim 14, wherein:
said control block decides whether a divide by twenty-eight or a divide by twenty-nine is desired based on said state of said FIFO, and
said first control signal is of a first polarity for three counts of said four count cycle and of a second polarity for one count of said four count cycle, and said second control signal is a first designated polarity when a twenty-eight divide is desired by said control block and a second designated polarity when a twenty-nine divide is desired by said control block.

16. Apparatus according to claim 15, wherein:
when said first control signal is of said second polarity and said first control signal is of said first designated polarity, said logic gate means controls said seven/eight counter to count seven, and when said first control signal is of said second polarity and said first control signal is of said second designated polarity, said logic gate means control said seven/eight counter to count eight.

17. Apparatus according to claim 14, wherein:
said clock circuit further includes a state machine for receiving an output of said control circuit means and for providing an output constituting said second control signal which is properly synchronous to said first control signal.

18. Apparatus for regenerating a plurality of jittered data streams each having a frequency within 1.544 Mb/sec ± 200 b/sec, comprising:
a) a control circuit means for generating six pulses during a one hundred and ninety three count cycle of a 1.544 Mb/sec clock; and
b) a plurality of clock circuit means, each coupled to said control circuit means and each for receiving a respective of said jittered data streams, for tracking the nominal frequencies of said respective jittered data streams, and based upon said nominal frequencies and utilizing said six pulses, each for generating a substantially unjittered DS1 signal at the nominal frequency of its respectively received jittered data stream.

19. Apparatus according to claim 18, said apparatus having a DS3 clock as an input thereto, wherein:
said control circuit means includes a divide block having said DS3 clock as input thereto, said divide block comprising means for dividing said DS3 clock by twenty-eight and dividing said DS3 clock by twenty-nine to create said clock of 1.544 Mb/sec nominal frequency, wherein said means for dividing divides said DS3 clock by twenty-nine one hundred eight-eight times and by twenty-eight five times during said one hundred and ninety three count cycle.

20. Apparatus according to claim 18, wherein:
said control circuit means includes a modulus one hundred ninety-three counter having said 1.544 Mb/sec nominal frequency clock as an input thereto, a count decoder coupled to said modulus one hundred ninety-three counter for providing said six control pulses over said one hundred ninety-three count cycle, three output lines over which said six control pulses are provided, and a logic gate coupled to a first and a second of said three output lines, wherein four of said control pulses are provided on said first output line, and one control pulse is provided on each of said second and a third of said three output lines, such that said logic gate provides five pulses over said one hundred ninety-three count cycle to said divide block, wherein each of said five pulses causes said divide block to divide by twenty-eight instead of twenty-nine.

21. Apparatus according to claim 18, said apparatus having a DS3 clock as an input thereto, wherein:

each said clock circuit includes a FIFO, a clock rate control means coupled to said FIFO and to said control circuit means, and a second divide block coupled to said clock rate control means and having said DS3 clock as an input thereto, wherein said FIFO receives said jittered data, and wherein said control block monitors the state of said FIFO, and in response to the state of said FIFO and said six control pulses, controls said second divide block to cause said second divide block to divide down said DS3 clock to provide a substantially unjittered output clock which matches the nominal frequency of said jittered data.

22. Apparatus according to claim 21, wherein:

said second divide block comprises a seven/eight counter and a four counter, said four counter changing states after each cycle of said seven/eight counter, and the output of said four counter providing a single output pulse over a cycle of said four counter, said single output pulse comprising the clock for said substantially unjittered DS1 signal.

23. Apparatus according to claim 22, wherein:

said four counter provides a first control signal for said seven/eight counter, and said clock rate control means provides a second control signal for said seven/eight counter, wherein said second divide block further comprises at least one logic gate means coupled to said first and second control signals for controlling whether said seven/eight counter counts to seven or to eight, and wherein said clock circuit further includes a state machine for receiving an output of said control circuit means and for providing an output constituting said second control signal which is properly synchronous to said first control signal.

24. Apparatus according to claim 23, wherein:

said control block decides whether a divide by twenty-eight or a divide by twenty-nine is desired based on said state of said FIFO, and said first control signal is of a first polarity for three counts of said four count cycle and of a second polarity for one count of said four count cycle, and said second control signal is a first designated polarity when a twenty-eight divide is desired by said control block and a second designated polarity when a twenty-nine divide is desired by said control block, and when said first control signal is of said second polarity and said first control signal is of said first designated polarity, said logic gate means controls said seven/eight counter to count seven, and when said first control signal is of said second polarity and said first control signal is of said second designated polarity, said logic gate means control said seven/eight counter to count eight.

* * * * *